United States Patent Office 3,125,598
Patented Mar. 17, 1964

3,125,598
DIALKYLAMINOARYL ARYLCARBAMATES
Engelbert Kühle, Cologne-Stammheim, and Ludwig Eue, Cologne-Mulheim, Germany, assignors to Farbenfabriken Bayer Aktiengesellschaft, Leverkusen, Germany, a corporation of Germany
No Drawing. Filed Nov. 30, 1959, Ser. No. 855,989
Claims priority, application Germany Dec. 6, 1958
4 Claims. (Cl. 260—471)

The present invention relates to and has as its objects new and useful compounds with herbicidal activities, and processes for their production. Generally the new compounds are condensation products of isocyanates with such aromatic compounds containing at least one free hydroxyl group and in addition thereto at least one tertiary amino methyl group being either in o- or p-position.

Certain ureas and carbamates are already known to be effective and powerful herbicides. Thus e.g. p-chlorophenyl dimethyl urea (CMU) a herbicide which became of major practical importance during the last years, as well as the m-chloro-phenyl carbamic acid isopropyl ester (CIPC) are widely used as a herbicide, especially for the germinating control of potatoes.

The condensation products of the present invention are also carbamates which distinguish themselves from those compounds previously known by a basic substituent. The new carbamic acid derivatives of the present application more specifically may be shown by the following general formula

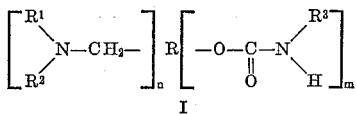

in which R stands for aromatic or aromatic-heterocyclic radicals, $R^1$ and $R^2$ stand for lower alkyl radicals, $R^3$ is an aromatic or an aliphatic radical, and $n$ is a whole number from 1 to 3, and $m$ is a whole number from 1 to 2.

The preparation of the new compounds starts from known condensation products of Mannich-type, i.e. of condensation products of phenols with formaldehyde and secondary amines. It is known that regarding the number and position of other substituents of a benzene nucleus up to 3 amino methyl groups may be introduced by this way in a benzenic ring system. Thus e.g. phenol itself reacts with formaldehyde and dimethyl amine, giving 2,4,6-tris-(dimethyl-aminomethyl)-phenol.

Further preparation of the inventive compounds starts from these Mannich condensation products by various possible ways. Thus e.g. the compounds of the Mannich-type may be reacted with isocyanates to the new inventive carbamic acid derivatives. This reaction is to be seen from the following scheme in which the symbols have the same significance as given above:

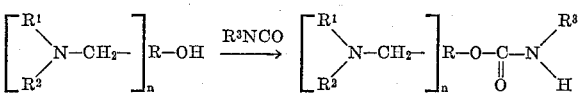

As it has been said before the carbamic compounds containing at least one free hydroxyl group must at least have an amino-methyl group either in o- or p-position. The aromatic compounds which may be used according to the above invention may be monocyclic or polycyclic aromatic ring system, but may also contain a condensed benzenic heterocyclic ring system e.g. of the quinoline-, phenantridine-type and the like. In addition to the tertiary amino methyl groups the aromatic group R may also contain further substituents such as alkyl, cycloalkyl, aryl-groups, halogen atoms, nitro-groups, acyl-amino-groups, alkoxy-groups, carbalkoxy-groups, and the like. It has to be understood that not only 1, but more than 1 free OH-group may be present in the molecule of the starting material. The second reaction component of the above equation, namely the isocyanate compound may be of aliphatic, cyclo-aliphatic, heterocyclic or aromatic nature and may be a mono- or poly-isocyanate. If poly-isocyanates are used the above shown end product is a di- or polycarbamic acid ester. Examples for isocyanates are methyl-isocyanate, ethyl-isocyanate, propyl - isocyanate, hexyl - isocyanate, ω-chlorohexyl-isocyanate, cyclohexyl-isocyanate, phenyl-isocyanate, o-, m- and p-chlorophenyl-isocyanate, the various lower alkoxy phenyl-isocyanates, the different nitro-phenyl-isocyanates, α- and β-naphthyl-isocyanate (possibly further substituted), hexamethylene-diisocyanate, the various phenylene-diisocyanates, the various naphthyl-diisocyanates, and the like.

The reaction shown by the above formula usually starts at room temperature or even at lower temperatures and is exothermic. It might be advantageous to carry out the inventive reaction in suitable inert organic solvents such as lower aliphatic ketone (acetone), benzene, toluene, chloro-benzene, and the like. In other cases it might be better to react the free components without any solvent at all. Mostly reaction should be carried out with equimolecular amounts of starting materials, i.e. reacting 1 isocyanate group with a hydroxyl group. If compounds with more hydroxyl groups and more than 1 isocyanate groups are reacted and compounds containing in the end material such free groups are desired then reaction in a known equimolecular proportion might lead to the desired result.

The new compounds of the present invention prepared by this way usually are known undistillable slightly colored oils or resins. As Mannich bases of aromatic nature they decompose while heating.

A preferred method of preparing stable salts of the inventive compounds with organic acids consists in carrying out the above shown reaction in free aliphatic carbonic acids such as formic acid, acetic acid, propionic acid, methoxy-acetic acid, chloro-acetic acid, dichloro-acetic acid, trichloro-acetic acid, fumaric acid, cytric acid, maleic acid, and the like. In this case the Mannich-base-salts of those acids are obtained. If the acids used in excess are easily distillable the excess of acids might be removed by distillation if necessary in vacuum, thus yielding the pure salts of the above shown Mannich bases. If these salts are desired in addition to the acid also inert organic solvents may additionally be used for completion of the aforedescribed reaction. In case of using additionally inorganic solvents the desired acid might be used in about equimolecular proportions.

Other known ways for preparing the inventive compounds are reacting the free hydroxy group containing Mannich-bases with carbamic acid chlorides as it is to be seen from the following equation:

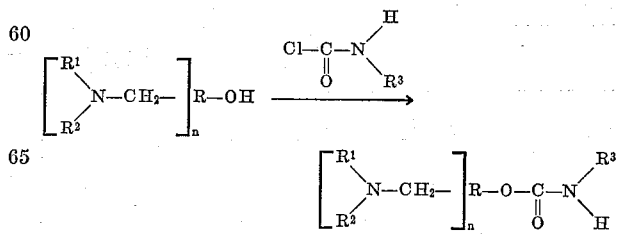

Another way for obtaining the inventive compounds with the reaction of the hydroxyl groups containing Mannich-bases with phosgene and further reaction of the formic acid ester chlorides with suitable primary amines is as it is to be seen from the following equation:

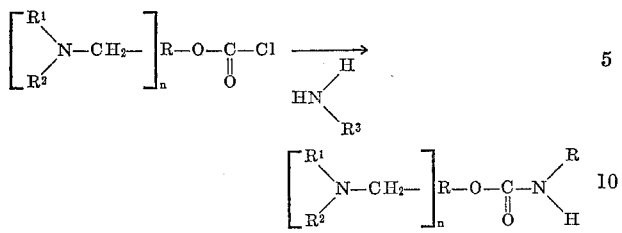

The symbols in these formulae again have the same significance as said above.

The new products of the present invention distinguish themselves mostly by herbicidal activities; they are either total herbicides or selective herbicides. Other compounds are fungicides and at last the new products of this invention may be used as intermediates in the synthetic resin field.

If used as herbicides or fungicides use of the above compounds of the present invention is achieved by ways known in principle i.e. by admixing the active ingredients with inert diluents or carriers either solid or liquid and then applying these mixtures or carriers where undesired plants have to be destroyed. Suitable solid diluents or extenders are e.g. talc, chalk, bentonite, clay, fuller's earth, silica, and the like. Liquid formulations are mainly of aqueous nature. If necessary auxiliary solvents such as dimethyl formamide or acetone are necessary. Also addition of suitable emulsifiers might be advantageous; such emulsifiers which are mostly of known ionic type and which mainly consist of polyglycol ethers of aromatic compounds such as nonyl phenyl polyglycol ether, are benzyl hydroxy diphenyl polyglycol ether.

The following examples may illustrate the present invention without, however, limiting the present invention thereto.

*Example 1*

20 grams of 2,4,6-tri-(dimethyl aminomethyl)-phenol are dissolved in 50 ml. of acetone and then treated at room temperature with 9 grams of phenyl isocyanate. The reaction is exothermic and the temperature rises to about 35° C. The reaction mixture is stirred for a short time and then the acetone is distilled off. There are obtained 29 grams of the 2,4,6-tri-(dimethyl aminomethyl)-phenyl-N-phenyl-carbamic acid. Analysis of this compound showed the following results:

Calculated: C, 68.8%; H, 8.32%; N, 14.6. Found: C, 68.8%; H, 8.50%; N, 14.3%.

By the same way there are obtained from 2,4,6,-tri-(dimethyl aminomethyl)-phenol with the following isocyanates the corresponding carbamic acid esters which were identified by analysis:

| Isocyanate | Summary formula | Reaction product (analysis) |
|---|---|---|
| CH₃—⟨ ⟩—NCO | $C_{23}H_{34}N_4O_2$ | Calc.: C, 69.2%; H, 8.55%; N, 14.08%. Found: C, 68.8%; H, 8.71%; N, 13.83%. |
| H₅C₂O—⟨ ⟩—NCO | $C_{24}H_{36}N_4O_3$ | Calc.: C, 67.5%; H, 8.42%; N, 13.05%. Found: C, 67.8%; H, 8.99%; N, 13.04%. |

*Example 2*

30 grams of 2,4,6-tri-(diethyl aminomethyl)-phenol are dissolved in 50 ml. of acetone whereupon 10 grams of phenyl isocyanate dissolved in 10 ml. of acetone are added dropwise. After the slightly exothermic reaction has slowed down the reaction solution is concentrated in vacuum. The 2,4,6-tri-(diethyl amino-methyl)-phenyl-N-phenyl-carbamic acid remains as a dark yellow colored oil. The yield is almost quantitative.

The following analytical data show the identity of this compound: $C_{28}H_{44}N_4O_2$.

Calc.: C, 71.9%; H, 9.40%; N, 11.95%. Found: C, 71.7%; H, 9.20%; N, 11.58%.

By the same way but using the corresponding equimolecular amounts of ethyl isocyanate there is obtained the following compound:

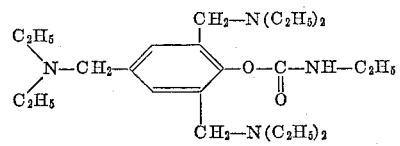

*Example 3*

35 grams of 2,4,6-tri-(diethyl aminomethyl)-phenol are dissolved in 100 ml. of acetone whereupon a solution of 8.4 grams of hexamethylene diisocyanate in 30 ml. of acetone is added. The temperature slowly rises to about 30° C. Stirring is continued for a short time and the solution then is concentrated in vacuum. 44 grams of the corresponding carbamate are obtained. The following analytical data show the identity of the compound: $C_{50}H_{90}N_8O_4$.

Calc.: C, 69.3%; H, 10.40%; N, 12.92%. Found: C, 69.9%; H, 9.57%; N, 12.38%.

By using the equimolecular amount of o-phenylene diisocyanate there is obtained the corresponding compound of the following formula

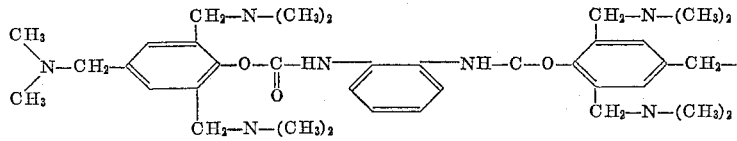

*Example 4*

9 grams of 3,5-dimethyl-6-(dimethyl amino methyl)-phenol are dissolved in 75 ml. of acetone whereupon 6 grams of phenyl isocyanate are added. After the reaction has been completed the solution is freed from acetone by distillation at last in vacuum. There are obtained 14.5 grams of the corresponding N-phenyl carbamate in the form of a resinous oil. Analytical data: $C_{18}H_{22}N_2O_2$.

Calc.: C, 72.5%; H, 7.38%; N, 9.40%. Found: C, 72.1%; H, 7.44%; N, 9.21%.

If instead of phenyl isocyanate 3,4-dichlorophenyl isocyanate are used the following compound is obtained:

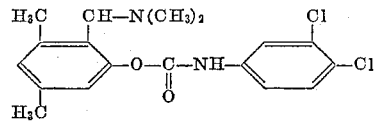

*Example 5*

16.5 grams of 4-methyl-6-(dimethyl aminomethyl)-phenol are dissolved in 100 ml. of acetone and then treated slowly while stirring with 11.9 grams of phenyl isocyanate. Stirring is continued for some time whereupon the solvent is distilled off at last in vacuum. There are obtained 26 grams of a yellowish oil which has been identified by the following analysis: $C_{17}H_{20}N_2O_2$.

Calc.: C, 71.8%; H, 7.04%; N, 9.86%. Found: C, 71.8%; H, 7.03%; N, 9.92%.

If instead of phenyl isocyanate the isocyanates shown in the following table are used in the same manner as described above there are obtained the compounds shown in the table below and identified by the following analysis:

| Isocyanate | Summary formula | Reaction product (analysis) |
|---|---|---|
| $C_2H_5NCO$ | $C_{13}H_{20}N_2O_2$ | Calc.: C, 66.1%; H, 8.47%; N, 11.86%. Found: C, 66.8%; H, 9.09%; N, 12.10%. |
| 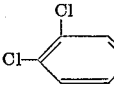 | $C_{17}H_{18}Cl_2N_2O_2$ | Calc.: C, 57.8%; H, 5.10%. Found: C, 59.5%; H, 5.60%. |

*Example 6*

11 grams of 2,6-di-(dimethylaminomethyl)-4-methylphenol are dissolved in 70 ml. of acetone and then slowly treated while stirring with 6 grams of phenyl isocyanate. After the solvent has been distilled off at last in vacuum there are obtained 16.5 grams of an oily reaction product which has been identified by the following results: $C_{20}H_{27}N_3O_2$.

Calc.: C, 70.4%; H, 7.92%, N, 12.33%. Found: C, 70.9%; H, 8.04%; N, 11.50%.

In the same way there may be used the following isocyanates having the reaction products shown in the following table:

| Isocyanate | Summary formula | Reaction product (analysis) |
|---|---|---|
| $C_2H_5NCO$ | $C_{16}H_{27}N_3O_2$ | Calc.: N, 14.35%. Found: N, 14.47%. |
| 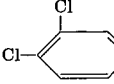 | $C_{20}H_{25}Cl_2N_3O_2$ | Calc.: Cl, 17.30%. Found: Cl, 17.55%. |

*Example 7*

21 grams of 4-acetylamino-6-(dimethylaminomethyl)-phenol are dissolved in 150 ml. of acetone. While stirring there are added slowly 18.8 grams of 3,4-dichlorophenyl isocyanate. The solvent is distilled off in vacuum and there are obtained 40 grams of a resinous oil which is identified by analysis.

Calc.: C, 54.6%; H, 4.79%; Cl: 17.9%. Found: C, 54.9%; H, 5.21%; Cl, 17.3%.

*Example 8*

18.5 grams of 4-chloro-6-(dimethylaminomethyl)-phenol are dissolved in 150 ml. of acetone, whereupon 12 grams of phenyl isocyanate are added slowly while stirring the reaction mixture. The temperature slowly rises to 30° C. After stirring is continued for some time the solvent is distilled off at last in vacuum whereupon 30 grams of a resinous oil are obtained. Identification by analysis showed the following results: $C_{16}H_{17}ClN_2O_2$.

Calc.: C, 63.0%; H, 5.58%; N, 9.20%. Found: C, 62.2%; H, 5.60%; N, 9.23%.

In the same way but using instead of phenyl isocyanate the corresponding equimolecular amount of ethyl isocyanate there is obtained the following compound identified by analysis:

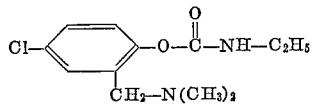

$C_{12}H_{17}ClN_2O_2$.
Calc.: C, 56.2%; H, 6.62%; N, 10.92%. Found: C, 56.4%; H, 6.73%; N, 9.80%.

*Example 9*

22 grams of 2,4-dichloro-6-(dimethylaminomethyl)-phenol are dissolved in 150 ml. of acetone and treated slowly while stirring with 12 grams of phenyl isocyanate. After the reaction has slowed down the solvent is distilled off at last in vacuum whereupon 33 grams of a reddish oily product are obtained. Identification has been carried out by analysis: $C_{16}H_{16}Cl_2N_2O_2$.

Calc.: C, 56.7%; H, 4.73%; Cl, 20.94%. Found: C, 55.4%; H, 4.50%; Cl, 23.10%.

*Example 10*

20 grams of 1-(dimethylaminomethyl)-2-naphthol are dissolved in 100 ml. of acetone whereupon 7 grams of ethyl isocyanate are added slowly while stirring. The mixture rises above 30° C. The reaction is completed by further stirring for 30 minutes and the solution then is concentrated at last in vacuum. 25 grams of an oily product of the following formula remain:

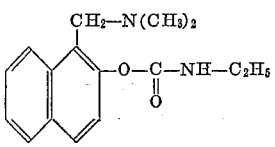

*Example 11*

22.4 grams of 2,5-bis-(dimethylaminomethyl)-hydroquinone are suspended in 150 ml. of acetone. To the suspension there are added at room temperature dropwise and while stirring a solution of 12 grams of phenyl isocyanate in 30 ml. of acetone. The temperature rises to about 30° C. Stirring is continued for 1 further hour. The reaction product precipitates and amounts to 22 grams and is isolated by filtration with suction. It melts at 136° C., and is a compound of the following formula:

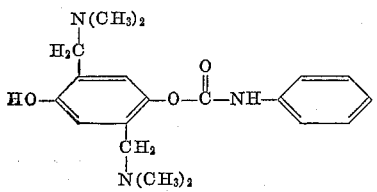

By the same way but using 2 molecular equivalents of phenyl isocyanate there is obtained the bis-urethane melting at 144° C.:

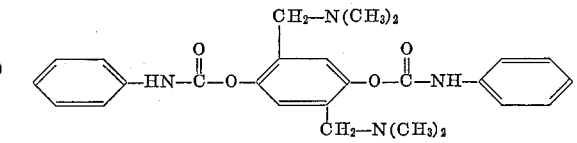

*Example 12*

6 grams of 2,5-bis-(dimethylaminomethyl)-hydroquinone are suspended in 50 ml. of acetone whereupon while stirring there are added dropwise 4.1 grams of p-chlorophenyl isocyanate dissolved in 20 ml. of acetone. Working up procedure is carried out as described in the foregoing example. After filtration and drying there are obtained 6.5 grams of the amino urethane melting at 149° C.

By the same way but using 2 molecular amounts of p-chlorophenyl isocyanate the corresponding bis-urethane is obtained in an amount of 8.2 grams. This bis-urethane melts at 157° C.

*Example 13*

20 grams of 7-dimethylamino methyl-8-hydroxyquinoline are dissolved in 100 ml. of acetone and then treated slowly with 12 grams of phenyl isocyanate dissolved in 30 ml. of acetone. The reaction mixture after some further stirring is continued in vacuum. The oily residue slowly solidifies and amounts to 32 grams. The crude product which is almost pure melts between 95–100° C.

The reaction product may be shown by the following formula:

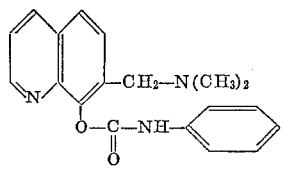

Example 14

20 grams of 1-(dimethylaminomethyl)-2-naphthol are dissolved in 50 ml. of triethyl amine. Below 15° C. there are added while stirring 12 grams of phenyl isocyanate. The reaction product of the following formula crystallizes soon and may be isolated by filtration. By concentration of the mother liquor the further crop of reaction product may be obtained. There are obtained 26 grams of the aforeshown carbamic acid ester melting at 90–95° C.

Example 15

40 grams of 1-(dimethylaminomethyl)-2-naphthol are dissolved in 100 ml. of acetic acid; while stirring there are added dropwise at 45° C. 24 grams of phenyl isocyanate. The temperature rises to about 50° C. Stirring is continued for some time and the acetic acid in excess is distilled off in vacuum. The acetate of the compound shown in the foregoing example is obtained in an amount of 73 grams.

Example 16

40 grams of 1-(dimethylaminomethyl)-2-naphthol are dissolved in 100 ml. of acetic acid, and while stirring there are added at 45° C. 31 grams of p-chlorophenyl isocyanate dissolved in 20 ml. of acetone. The temperature rises to about 48° C. After distilling off the solvent in vacuum there are obtained 72 grams of the acetate of N-(p-chlorophenyl)-carbamic acid-2-[(1-dimethylaminomethyl)-naphthyl]-ester.

Example 17

35.8 grams of 3,5-dimethyl-6-(dimethylaminomethyl)-phenol are dissolved in 80 ml. of acetic acid at 40° C. and then treated dropwise while stirring with a solution of 31 grams of p-chlorophenyl isocyanate in 20 ml. of acetone. After completion of the reaction the solvent is distilled off in vacuum whereupon there are obtained 72 grams of N-(p-chlorophenyl)-carbamic acid - [3,5-dimethyl-6-(dimethylaminomethyl)-phenyl]-ester as its acetate.

To demonstrate the utility of the compounds of this invention the following examples are given:

Example 18

Mixed cultures of mustard and oat are sprayed with aqueous emulsions containing an active compound of Example 1 in a concentration of 0.05%. The aqueous emulsion as been prepared by mixing same amounts of active ingredient and acetone adding thereto the same amount of commercial nonionic emulsifier (nonyl phenol polyglycol ether—MPC). This mixture then is diluted to the above said concentration.

Mustard and oat are completely destroyed thereby.

Similar results are obtained with the other compounds described in the foregoing examples.

Example 19

Mixed cultures of mustard and oat are sprayed with aqueous emulsions as described in the foregoing example, 24 hours after sowing. The amount of active ingredient (of Example 1) used per hectare should amount to 1.5 kg. per hectare; 10 days after treatment the young mustard plants begin to die and the oats showed chlorosis. 3 weeks later all the plants are completely destroyed. The other compounds shown in the examples exhibit similar properties.

Example 20

If bush bean plants (*Vitia faba*) are sprayed with a 0.1% aqueous solution of the compound of Example 1 (the solution being prepared as described in Example 18). The plants lose their leaves within 24 to 36 hours. The compound thus acts also as a defoliant or desiccant.

We claim:

1. A compound of the formula

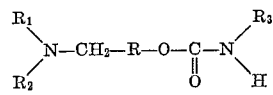

wherein $R_1$ and $R_2$ stand for lower alkyl, $R_3$ stands for a member selected from the group consisting of phenyl and chlorophenyl and R is selected from the group consisting of dimethyl phenylene and naphthyl.

2. The compound of the following formula

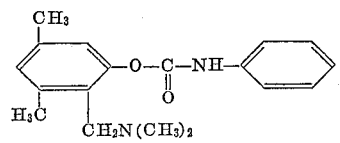

3. The compound of the following formula

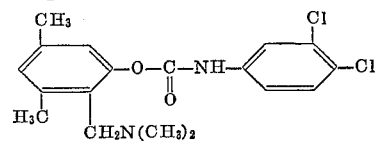

4. The compound of the following formula

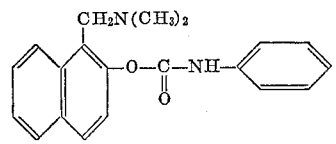

References Cited in the file of this patent

UNITED STATES PATENTS 2,362,508   Stevens et al. _____ Nov. 14, 1944
2,843,519   Fitch _____ July 15, 1958

FOREIGN PATENTS 185,371   Austria _____ Apr. 25, 1956

OTHER REFERENCES

Kolbenzen et al.: J. A. and Food Chem., 2, 866, 869, 870 (1954).